United States Patent
Zhou et al.

(10) Patent No.: US 10,819,868 B2
(45) Date of Patent: Oct. 27, 2020

(54) SCANNING APPARATUS

(71) Applicant: Jabil Circuit (Guangzhou) Ltd., Guangzhou (CN)

(72) Inventors: Dinghuan Zhou, Guangzhou (CN); Hau Keat Khaw, Guangzhou (CN)

(73) Assignee: Jabil Circuit (Guangzhou) Ltd., Guangzhou (CN)

(*) Notice: Subject to any disclaimer, the term of this patent is extended or adjusted under 35 U.S.C. 154(b) by 0 days.

(21) Appl. No.: 16/584,036

(22) Filed: Sep. 26, 2019

(65) Prior Publication Data

US 2020/0106905 A1    Apr. 2, 2020

(30) Foreign Application Priority Data

Sep. 28, 2018  (CN) .......................... 2018 1 1138903

(51) Int. Cl.
*H04N 1/00* (2006.01)

(52) U.S. Cl.
CPC ....... *H04N 1/00519* (2013.01); *H04N 1/0061* (2013.01); *H04N 1/00334* (2013.01)

(58) Field of Classification Search
CPC ........... H04N 1/00334; H04N 1/00519; H04N 1/0061; H04N 2201/0471; H04N 1/2032; H04N 1/203; H04N 1/00572; H04N 1/00588; H04N 1/00612; H04N 1/00602; H04N 2201/0094; H04N 1/00615; H04N 1/00631; H04N 2201/0081; H04N 2201/04722; H04N 2201/04729; H04N 2201/04732; H04N 2201/04734; H04N 1/00591; H04N 1/1017; H04N 1/12; H04N 1/193; H04N 2201/3288; H04N 1/00411; H04N 1/00432; H04N 1/00474; H04N 1/00482; H04N 1/00578; H04N 1/0062; H04N 1/00779; B25J 15/0441; B25J 15/0475; B25J 15/0491; B25J 15/0608; B25J 15/0616; B25J 19/065; B25J 9/1612; B25J 9/1687; B65G 1/1376; B65G 2201/02; B65G 2203/041; B65G 2203/042; B65G 2207/42; B65G 47/905; B65G 47/91;

(Continued)

(56) References Cited

U.S. PATENT DOCUMENTS 4,743,974 A * 5/1988 Lockwood ........... H04N 1/1017
                                                        355/23
4,967,233 A * 10/1990 Buchan ................ H04N 1/0311
                                                        358/496

(Continued)

*Primary Examiner* — Negussie Worku
(74) *Attorney, Agent, or Firm* — Young Basile Hanlon & MacFarlane, P.C.

(57) ABSTRACT

A scanning apparatus for scanning an object includes a frame and a scanning unit. The frame defines a passage and two frame openings. The passage has two passage openings opposite to each other in a first direction. The frame openings are opposite to each other in a second direction transverse to the first direction, and are in spatial communication with the passage. The scanning unit includes at least one scanning device that includes a scanning casing and a scanner. The scanning casing has a scanning opening in direct connection with one of the frame openings of the frame. The scanner is disposed in the scanning casing, and operable to scan the object via the scanning opening when the object is moving through the passage in the first direction.

20 Claims, 14 Drawing Sheets

(58) Field of Classification Search
CPC ........ B65G 47/92; G06Q 10/08; G06Q 50/28; G06K 7/10584; G06K 7/10732
USPC ........................................ 358/474
See application file for complete search history.

(56) References Cited

U.S. PATENT DOCUMENTS

| | | | | |
|---|---|---|---|---|
| 5,680,204 | A * | 10/1997 | Ferrara | H04N 1/1017 |
| | | | | 355/75 |
| 2003/0190180 | A1* | 10/2003 | Katayanagi | G03G 15/2053 |
| | | | | 399/406 |
| 2004/0238199 | A1* | 12/2004 | Yamanaka | G03G 21/1652 |
| | | | | 174/68.1 |
| 2006/0256391 | A1* | 11/2006 | Eom | H04N 1/00326 |
| | | | | 358/305 |
| 2012/0099167 | A1* | 4/2012 | Ciardullo | H04N 1/19594 |
| | | | | 358/498 |
| 2014/0021260 | A1* | 1/2014 | Cherry | G06K 7/01 |
| | | | | 235/475 |
| 2014/0185092 | A1* | 7/2014 | Takasu | G06F 3/1253 |
| | | | | 358/1.15 |
| 2014/0354970 | A1* | 12/2014 | Tinnemans | G03F 7/70058 |
| | | | | 355/67 |
| 2015/0048566 | A1* | 2/2015 | Utagawa | B65H 3/0684 |
| | | | | 271/10.02 |
| 2018/0089481 | A1* | 3/2018 | Gerst, III | G06K 19/06037 |
| 2018/0281430 | A1* | 10/2018 | Ohta | B41J 13/009 |
| 2019/0333244 | A1* | 10/2019 | Baker | G06K 9/20 |
| 2020/0017317 | A1* | 1/2020 | Yap | B25J 15/0608 |

* cited by examiner

SCANNING APPARATUS

CROSS-REFERENCE TO RELATED APPLICATION

This application claims priority of Chinese Invention Patent Application No. 201811138903.0, filed on Sep. 28, 2018.

FIELD

The disclosure relates to a scanning apparatus, more particularly to a scanning apparatus for scanning a barcode provided on, e.g., a printed circuit board.

BACKGROUND

During the process of manufacturing a printed circuit board, a barcode label including a one- or two-dimensional barcode is placed on the printed circuit board so that the barcode may be scanned later to gain information of the printed circuit board.

Conventionally, the barcode is scanned manually using a handheld scanner, which means that only one barcode can be scanned at a time. This conventional approach is time consuming, and human error may affect the scanning.

SUMMARY

Therefore, the object of the disclosure is to provide a scanning apparatus that can alleviate at least one of the drawbacks of the prior art.

According to one aspect of the disclosure, a scanning apparatus for scanning an object includes a frame and a scanning unit.

The frame defines a passage and two frame openings. The passage has two passage openings opposite to each other in a first direction. The frame openings are opposite to each other in a second direction transverse to the first direction, and are in spatial communication with the passage.

The scanning unit includes at least one scanning device that includes a scanning casing and a scanner. The scanning casing has a scanning opening in direct connection with one of the frame openings of the frame. The scanner is disposed in the scanning casing, and operable to scan the object via the scanning opening when the object is moving through the passage in the first direction.

According to another aspect of the disclosure, a scanning apparatus for scanning an object, including a frame defining a passage, and a scanning unit.

The scanning unit includes a first scanning device and a second scanning device. The first scanning device is disposed under and connected separably to the frame, and includes a first scanner. The second scanning device is disposed over and connected separably to the frame, and includes a second scanner.

At least one of the first and second scanners is operable to scan a corresponding portion of the object when the object is moving through the passage of the frame in a front-rear direction.

According to yet another aspect of the disclosure, a scanning apparatus for scanning an object includes a frame defining a passage, a scanning unit, a first coupling member, and a second coupling member.

The scanning unit includes a scanning device having a scanning casing that is disposed under and supports the frame, and a scanner that is disposed in the scanning casing. The scanner is operable to scan a corresponding portion of the object when the object is moving through the passage of the frame in a front-rear direction.

The first coupling member is mounted to a lower portion of the frame, and the second coupling member is mounted to an upper portion of the scanning casing and removably coupled to the first coupling member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
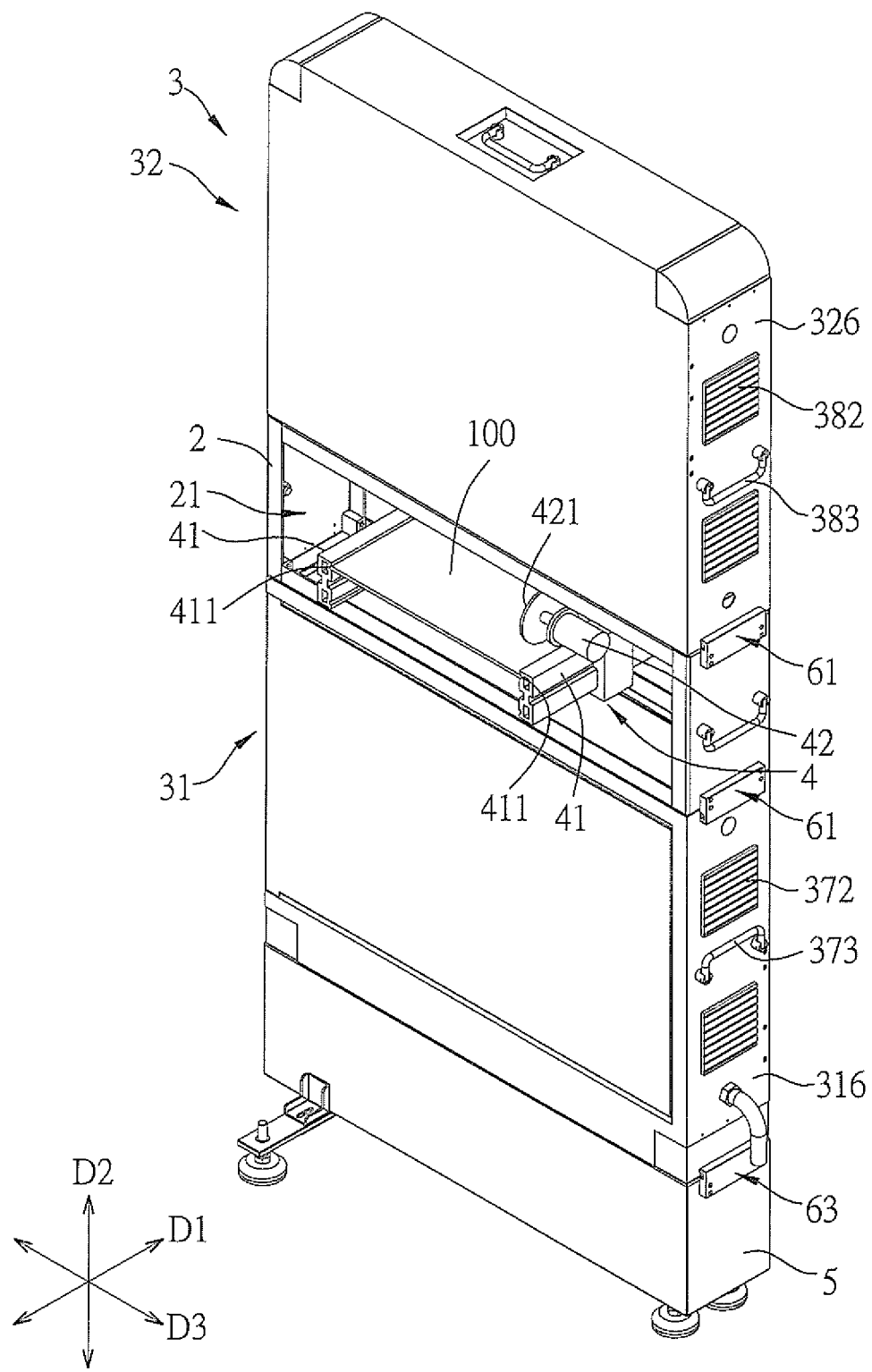
FIG. 1 is a perspective view of a first embodiment of a scanning apparatus according to the disclosure.

Before the present invention is described in greater detail, it should be noted that where considered appropriate, reference numerals or terminal portions of reference numerals have been repeated among the figures to indicate corresponding or analogous elements, which may optionally have similar characteristics.

Figure 2:
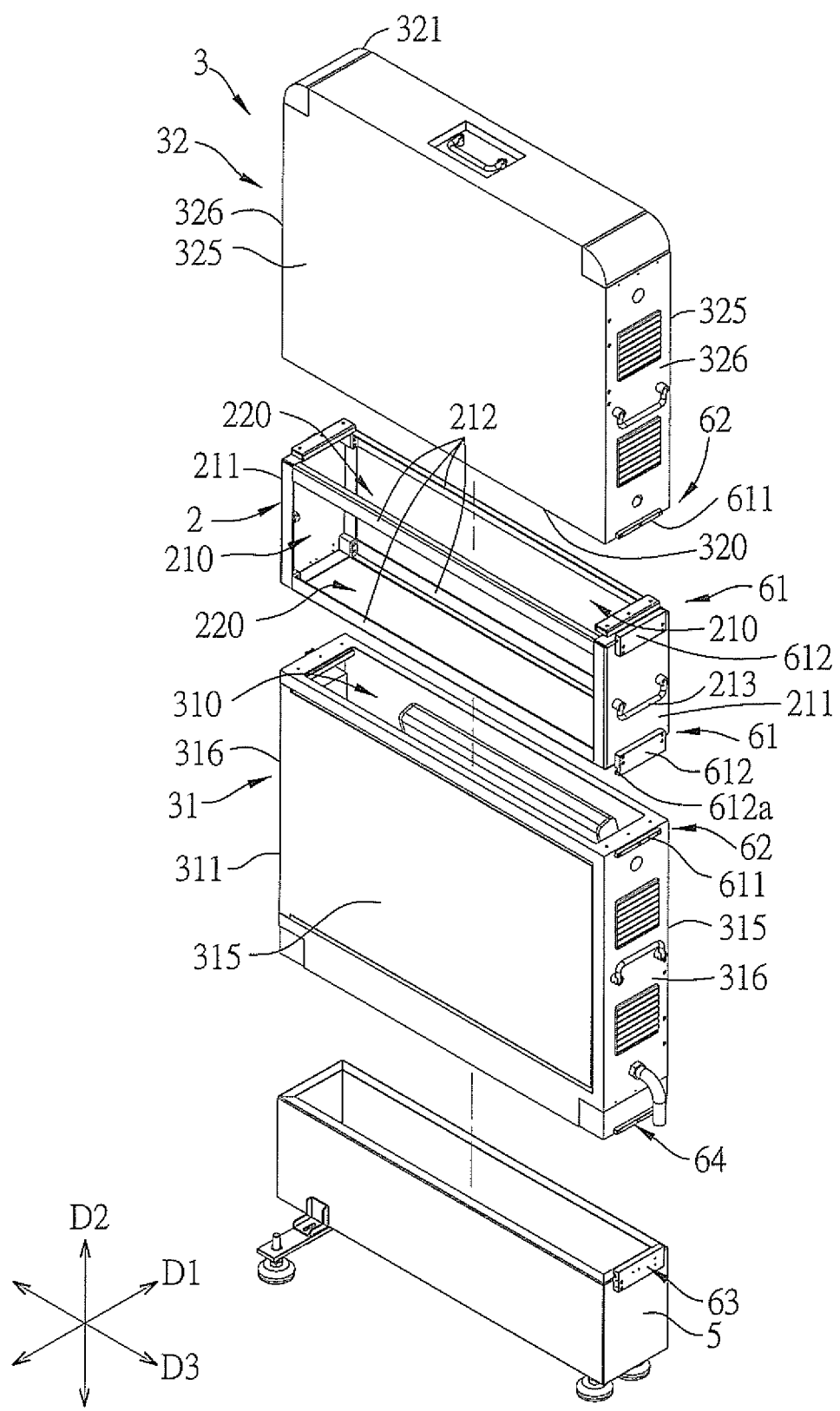
FIG. 2 is an exploded perspective view of the first embodiment.
Figure 3:
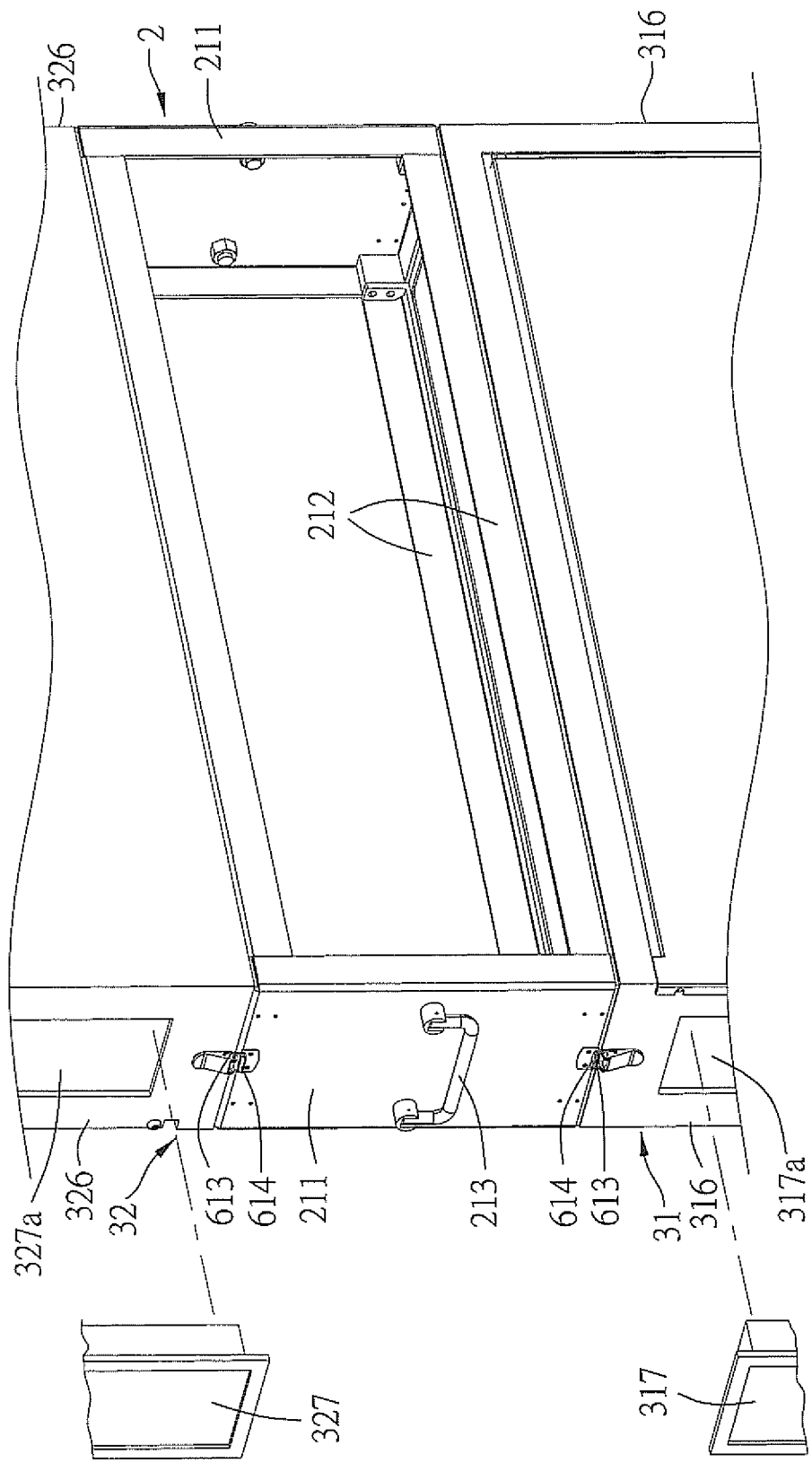
FIG. 3 is a fragmentary perspective view of the first embodiment illustrating how a frame is secured with first and second scanning devices.

Referring to FIGS. 1 to 3, a first embodiment of a scanning apparatus is for scanning an object 100 which has, for example, a label that has a one dimensional barcode, a two dimensional barcode, or other types of barcodes. In this embodiment, the object 100 is exemplified as a printed circuit board with a barcode label. In other embodiments, the object 100 may be a piece of paper printed with a barcode. The scanning apparatus includes a frame 2, a scanning unit 3, a conveyance unit 4, a base seat 5, a plurality of first coupling members 61, and a plurality of second coupling members 62. In this embodiment, the frame 2 and the scanning unit 3 are stacked on the base seat 5 in a top-down direction (D2).

The frame 2 defines a passage 21 and two frame openings 220. The passage 21 has two passage openings 210 that are opposite to each other in a first direction. The frame openings 220 are opposite to each other in a second direction transverse to the first direction, and are in spatial communication with the passage 21. In this embodiment, the first direction is a front-rear direction (D1) and the second direction is the top-down direction (D2). In the first embodiment, the frame 2 is substantially cuboid and includes two wall portions 211 spaced apart in a left-right direction (D3), four connecting portions 212 connecting the wall portions 211 in four corners of the wall portions 211, and two handles 213 disposed respectively on outer surfaces of the wall portions 211. The wall portions 211 and the connecting portions 212 cooperatively define the passage 21, the passage openings 210, and the frame openings 220.

Figure 7:
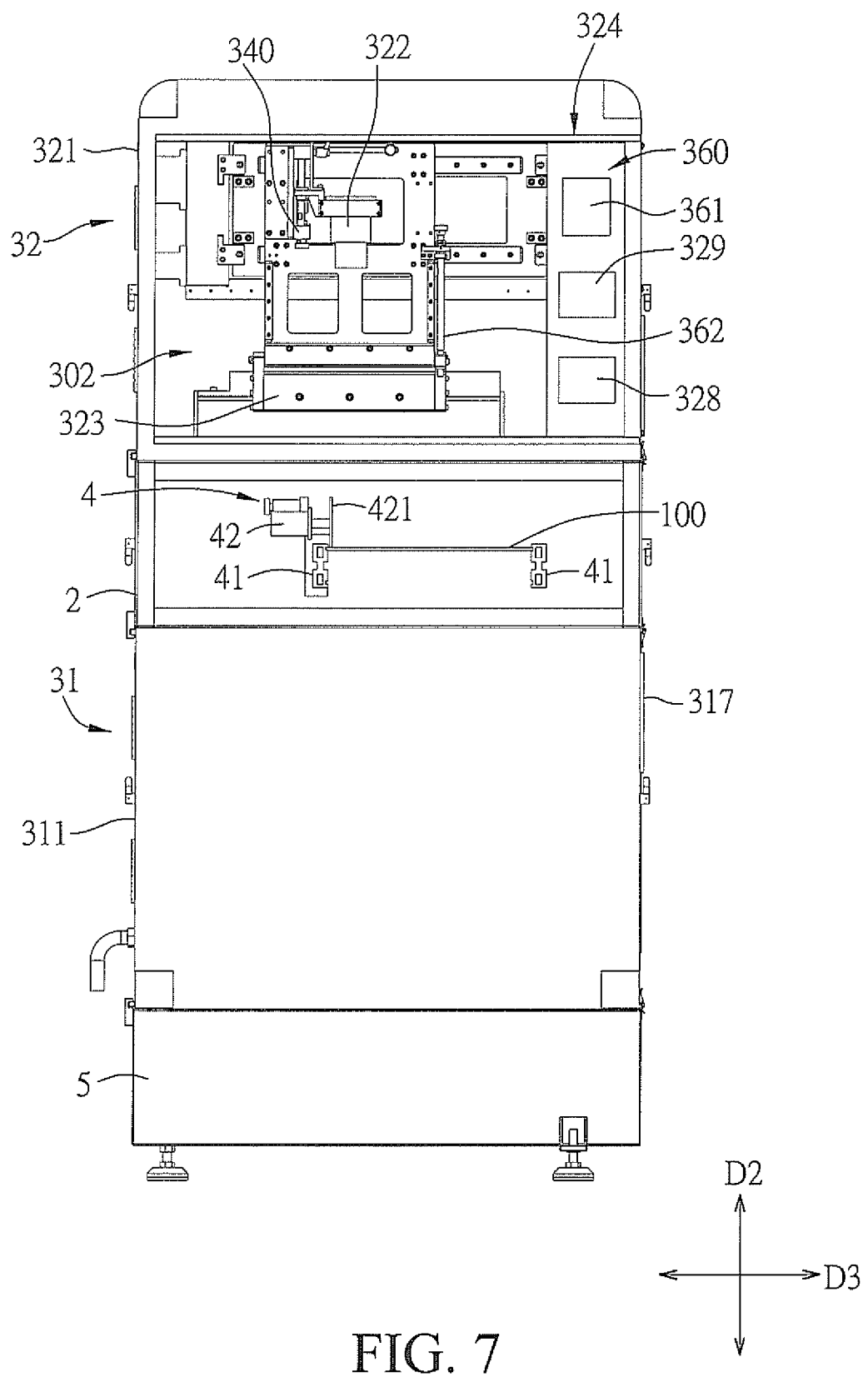
FIG. 7 is a schematic rear view illustrating the second scanning device of the first embodiment.
Figure 8:
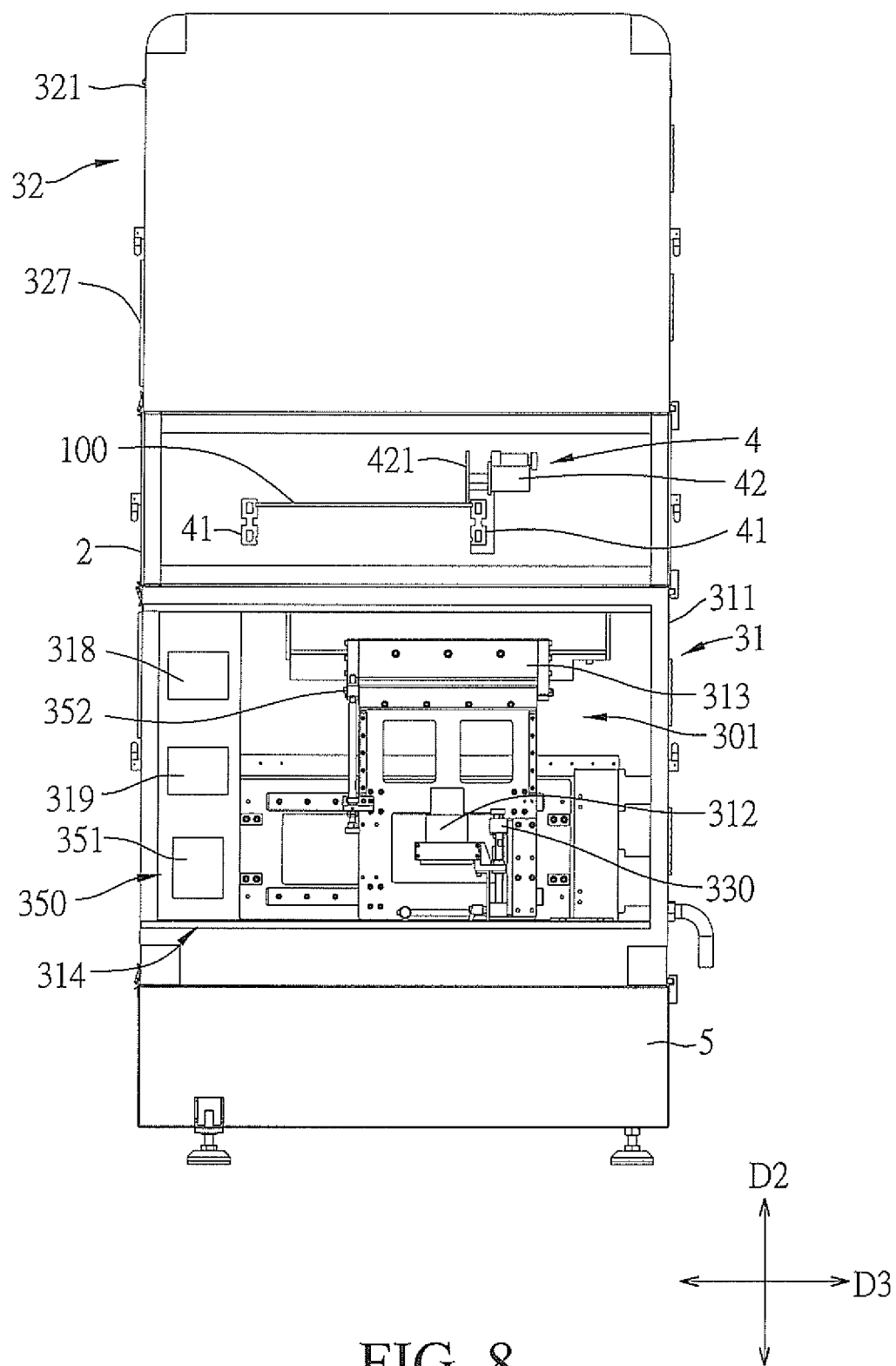
FIG. 8 is a schematic front view illustrating the first scanning device of the first embodiment.

Referring to FIGS. 2, 7, and 8, the scanning unit 3 includes first and second scanning devices 31, 32. In this embodiment, the first and second scanning devices 31, 32 have substantially the same structure and are substantially flat cuboid in shape. The first scanning device 31 is disposed under and connected separably to the frame 2, and includes a first scanner 312. The second scanning device 32 is disposed over and connected separably to the frame 2, and includes a second scanner 322. Each of the first and second scanning devices 31, 32 further includes a scanning casing 311, 321, a light-emitting member 313, 323, and a control unit 314, 324.

Further referring to FIG. 3, each of the scanning casings 311, 321 has a scanning opening 310, 320, two base walls 315, 325 opposite to each other in the first direction (i.e. the front-rear direction (D1)), a side wall 316, 326, a side opening 317a, 327a formed in the side wall 316, 326, and a side door 317, 327 openably covering the side opening 317a, 327a. For each of the scanning casings 311, 321, the side wall 316, 326 interconnects the base walls 315, 325, and cooperates with the base walls 315, 325 to define a receiving space 301, 302 that retains a respective one of the first and second scanners 312, 322, a respective one of the light-emitting members 313, 323, and a respective one of the control units 314, 324 therein. In this embodiment, each of the scanning casings 311, 312 has two side walls 316, 326 opposite to each other in the left-right direction (D3). Each of the side doors 317, 327 and a corresponding one of the side openings 317a, 327a allow user access to a respective one of the receiving spaces 301, 302 to adjust the devices in the respective one of the receiving spaces 301, 302.

Referring to FIGS. 1, 7 and 8, at least one of the first and second scanners 312, 322 is operable to scan the object 100 via a corresponding one of the scanning openings 310, 320 when the object 100 is moving through the passage 21 in the front-rear direction (D1). In this embodiment, the scanning openings 310, 320 of the first and second scanning devices 31, 32 are respectively in direct connection with the frame openings 220 of the frame 2 so that the scanners 312, 322 of the scanning devices 31, 32 are operable to scan the object 100 from two opposite directions during the movement of the object 100 through the passage 21.

Furthermore, the light-emitting members 313, 323 and the control units 314, 324 may be used to assist the first and second scanners 312, 322 in scanning the object 100. In this embodiment, the light-emitting members 313, 323 may be lamps or light-emitting diodes (LED). Each of the control units 314, 324 includes a programmable controller 318, 328, a power supply 319, 329, a scanner adjustment module 330, 340, and a light adjustment module 350, 360. Each of the power supplies 319, 329 is electrically connected to a respective one of the light-emitting members 313, 323, a respective one of the programmable controllers 318, 328, a respective one of the scanner adjustment modules 330, 340, and a respective one of the light adjustment modules 350, 360 to supply power thereto. Moreover, for each of the control units 314, 324, the programmable controller 318, 328 is communicably connected with the scanner adjustment module 330, 340 and the light adjustment module 350, 360 so that scanning processes of the first and second scanning devices 31, 32 may be controlled by a processing device (not shown) which is connected to the first and second scanning devices 31, 32 for sending instructions regarding process control to the programmable controllers 318, 328.

Each of the light adjustment modules 350, 360 has a light intensity adjustor 351, 361 and a light angle adjustor 352, 362 both communicably connected to a respective one of the light-emitting members 313, 323. Via the processing device, a user may control the scanner adjustment modules 330, 340 through the programmable controllers 318, 328 to respectively adjust angles between the first and second scanners 312, 322 and the object 100. Through the programmable controllers 318, 328, each of the light intensity adjustors 351, 361 may be controlled to adjust an intensity of light emitted by the respective one of the light-emitting members 313, 323, and each of the light angle adjustors 352, 362 may be controlled to adjust an angle of light emitted by the respective one of the light-emitting members 313, 323 with respect to the object 100.

Each of the first and second scanning devices 31, 32 may further include a switch (not shown) disposed on a corresponding one of the side walls 316, 326 and electrically connected to a respective one of the power supplies 319, 329. The switches allow the power supplies 319, 329 of the first and second scanning devices 31, 32 to be switched off from outside the first and second scanning devices 31, 32, respectively. Referring to FIGS. 1, 7 and 8, optionally, each of the first and second scanning devices 31, 32 may further include a plurality of cooling fans 372, 382 in spatial communication with a respective one of the receiving spaces 301, 302 and disposed on a corresponding one of the side walls 316, 326, and a plurality of handles 373, 383 (only one shown) disposed on a corresponding one of the side walls 316, 326. The cooling fans 372, 382 are for exhausting the heated air in the receiving spaces 301, 302 respectively, and the handles 373, 383 are for easy handling of the first and second scanning devices 31, 32.

In this embodiment, each of the first and second scanners 312, 322 is a line scan camera that has a scanning range covering a width of the object 100 in a width direction which is perpendicular to the first and second directions (i.e. the front-rear direction (D1) and the top-down direction (D2)), and that is operable to scan the width of the object 100 continuously in the first direction and to combine multiple scan images of the width of the object 100 to form an image of the entire object 100. The line scan camera has a line resolution of 8K and a maximum scanning frequency of 70 KHz. In a case where the width of the object 100 in the width direction is 400 mm, the size of one pixel in one line scan image is 0.049 mm (400 mm/8192 pixels). In this embodiment, the width direction is the left-right direction (D3).

The first and second scanning devices 31, 32 may be communicably connected to the processing device on the back-end, such as a computer, to enable control through interface of the computer. For example, the user may press a start button on the interface to command the first or second scanner 312, 322 to start scanning the object 100, and further zoom in or out on the interface to check the barcode information in the scanned image on the computer.

Figure 4:
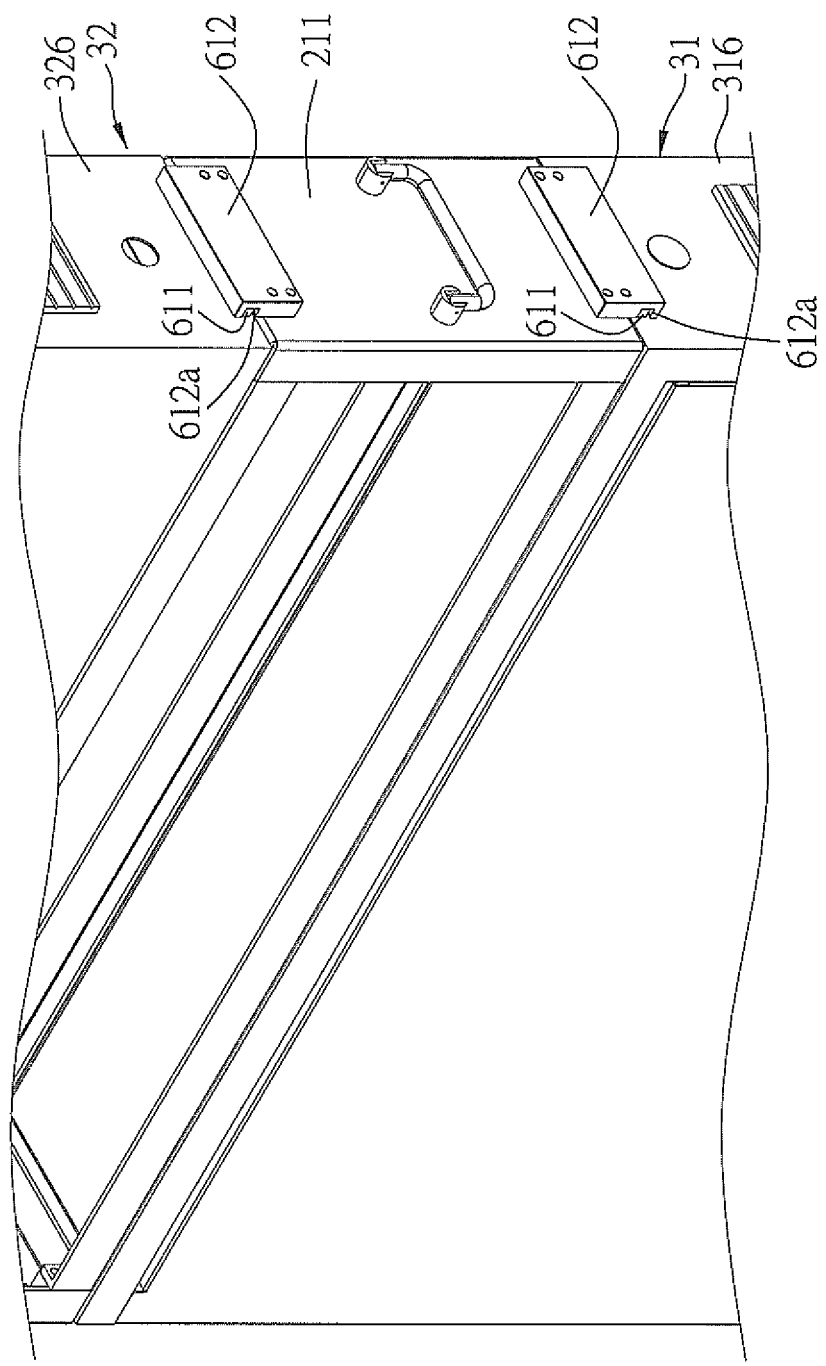
FIG. 4 is similar to FIG. 3 but from a different angle.

Referring to FIGS. 2 to 4, in this embodiment, the scanning apparatus includes two of the first coupling members 61 and two of the second coupling members 62. The first coupling members 61 are respectively mounted to lower and upper portions of the frame 2 and respectively proximal to the frame openings 220, respectively. Each of the first coupling members 61 includes a hook portion 614 and a clamp portion 612 disposed respectively on the wall portions 211 of frame 2. Each of the clamp portions 612 protrudes from the frame 2 and is formed with a groove 612a that extends in the front-rear direction (D1).

The second coupling members 62 are respectively mounted to a lower portion of the scanning casing 321 of the second scanning device 32 and to an upper portion of the scanning casing 311 of the first scanning device 31. Each of the second coupling members 62 includes a ring portion 613 and a block portion 611. The ring portions 613 are disposed on the same side of the scanning apparatus as the hook portions 614 and the block portions 611 are disposed on the same side of the scanning apparatus as the clamp portions 612. The block portions 611 correspond in shape to the grooves 612a of the clamp portions 612 such that the block portions 611 may respectively couple with the clamp portions 612. In this embodiment, when the first scanning device 31 is stacked below the frame 2 and the second scanning device 32 is stacked above the frame 2, the block portions 611 are respectively coupled with the clamp portions 612 and the ring portions 613 may be respectively coupled with the hook portions 614 so as to secure the frame 2 with the scanning unit 3. In other embodiments, the position of the first and second coupling members 61, 62 may be swapped, or other coupling mechanisms may be used.

Figure 5:
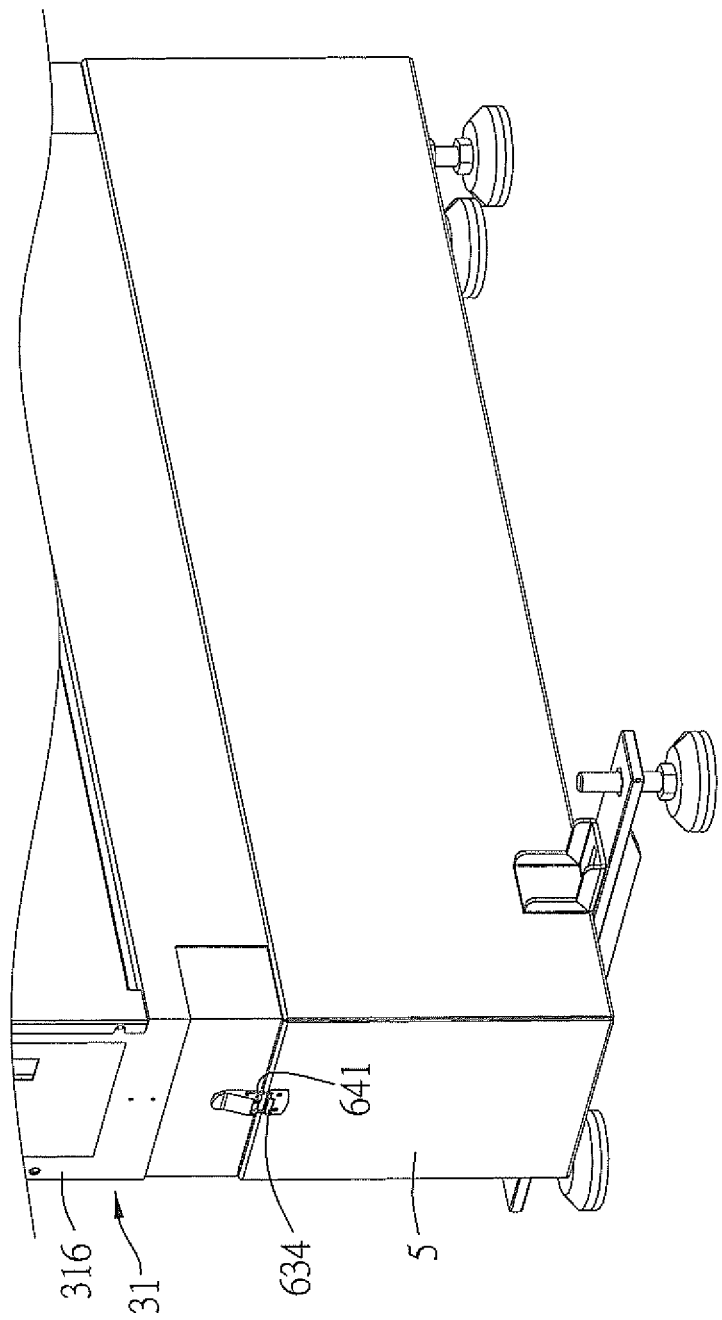
FIG. 5 is a fragmentary perspective view illustrating a base seat and the first scanning device of the first embodiment being secured to each other via third and fourth coupling members of the first embodiment.
Figure 6:
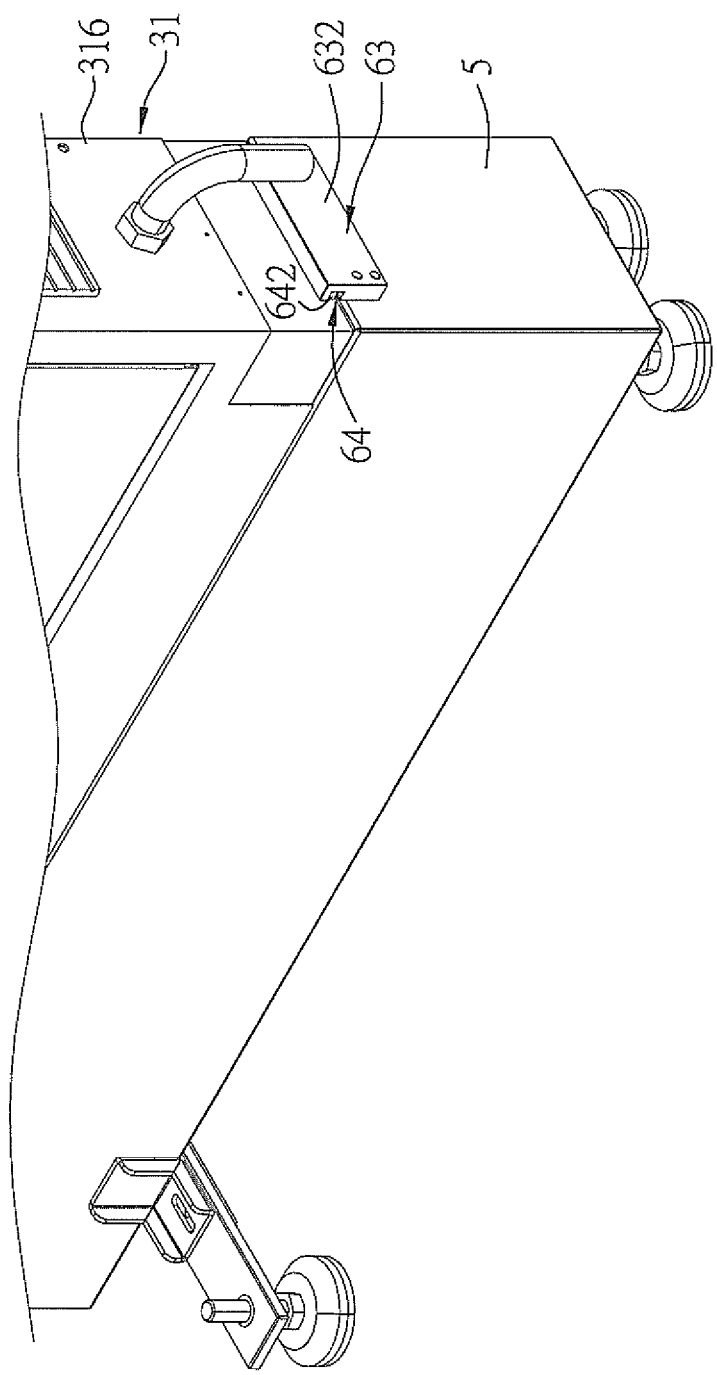
FIG. 6 is similar to FIG. 5 but from a different angle.

Referring to FIGS. 5 and 6, in this embodiment, the scanning apparatus further includes a third coupling member 63 and a fourth coupling member 64 respectively disposed on the base seat 5 and the first scanning device 31. The third coupling member 63 and the fourth coupling member 64 secure the scanning unit 3 along with the frame 2 with the base seat 5 in a separable manner. The third coupling member 63 is disposed on left and right sides of the base seat 5 and may have substantially the same structure as the first coupling members 61 in having a hook portion 634 and a clamp portion 632. The fourth coupling member 64 is disposed on the side walls 316 of the first scanning device 31, and may have substantially the same structure as the second coupling members 62 in having a ring portion 641 and a block portion 642.

Referring to FIGS. 1, 7 and 8, the conveyance unit 4 is adapted for loading the object 100 and assisting the object 100 through the passage 21, and includes two tracks 41 and a speed encoder 42. In this embodiment, the conveyance unit 4 extends through the passage 21 and is not fixedly connected to the frame 2.

The tracks 41 extend through the passage 21, are spaced apart along the left-right direction (D3), and protrude from the passage openings 210. Each of the tracks 41 extends along the front-rear direction (D1) and has a track groove 411 which receives therein a belt (not shown). The belt is powered by a motor (not shown) through a pulley (not shown), driving the belt to move along the front-rear direction (D1) such that when left and right edges of the object 100 are inserted respectively into the track grooves 411 from one end of the tracks 41, the object 100 is moved by the belt to the other end of the tracks 41 along the front-rear direction (D1) and passes between the first and second scanning devices 31, 32 to be scanned by the first and second scanning devices 31, 32.

The speed encoder 42 is communicably connected to the first and second scanners 312, 322 and has a sync wheel 421. The sync wheel 421 is adapted for contact with the object 100 to obtain a speed at which the object 100 is moving through the passage 21, to ensure that the first and second scanners 312, 322 can accurately scan the object 100. In other words, the speed encoder 42 controls a scanning frequency of the first and second scanners 312, 322.

The scanning apparatus of this embodiment has a simple installation process and is easy to operate. The first and second scanning devices 31, 32 only need to be stacked on the frame 2 to begin scanning, and the scanning casings 311, 321 thereof are compactly shaped and each has a pair of handles 373, 383 to allow easier handling and assembly. Furthermore, the track 41 of the conveyance unit 4 can move multiple objects 100 sequentially between the first and second scanning devices 31, 32 (i.e. the line scan cameras) to that the barcode labels on the objects 100 can be scanned quickly and continuously, which improves a scanning efficiency of the scanning apparatus.

Figure 9:
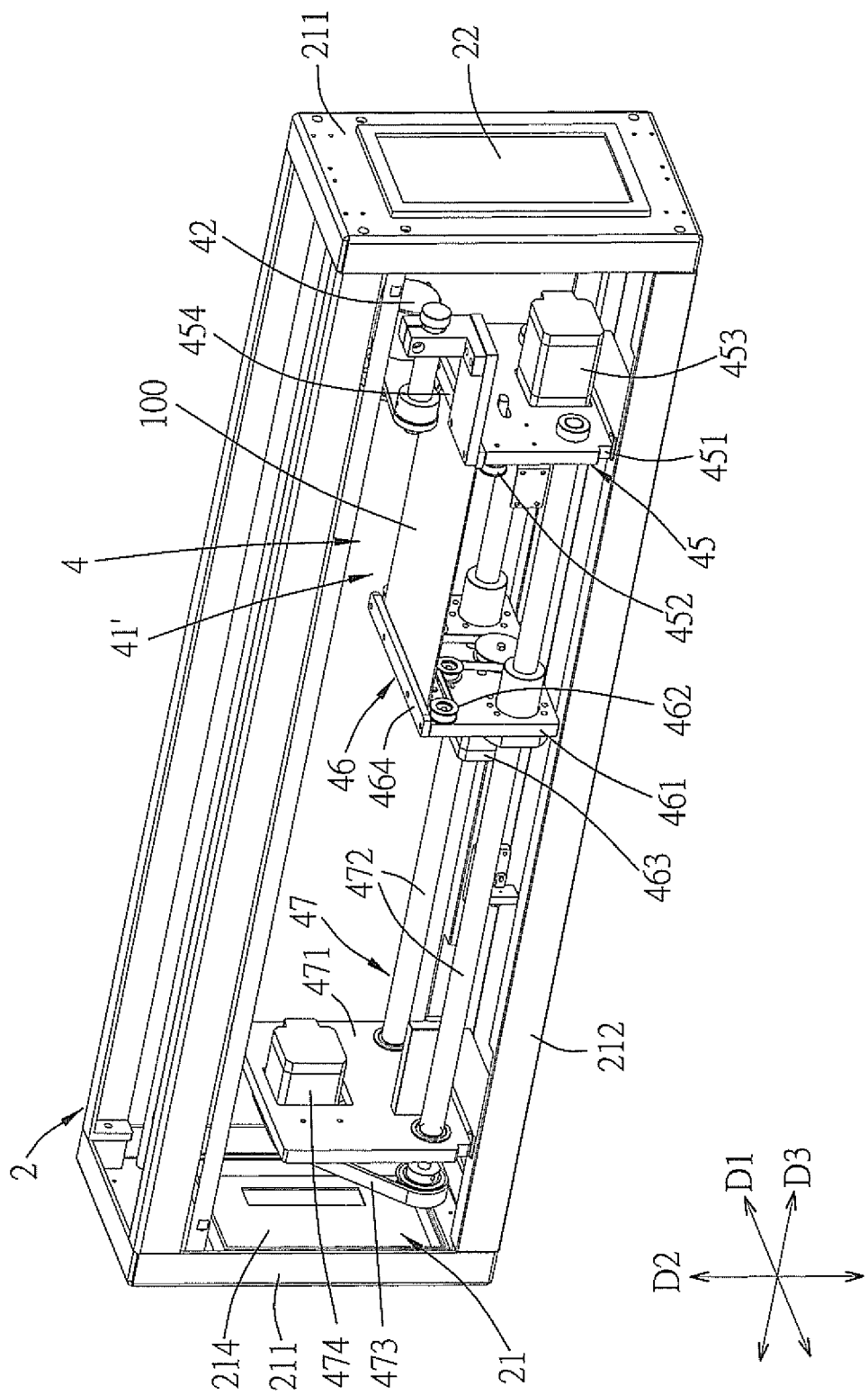
FIG. 9 is a perspective view of the conveyance unit and the frame of a variation of the first embodiment of the scanning apparatus.
Figure 10:
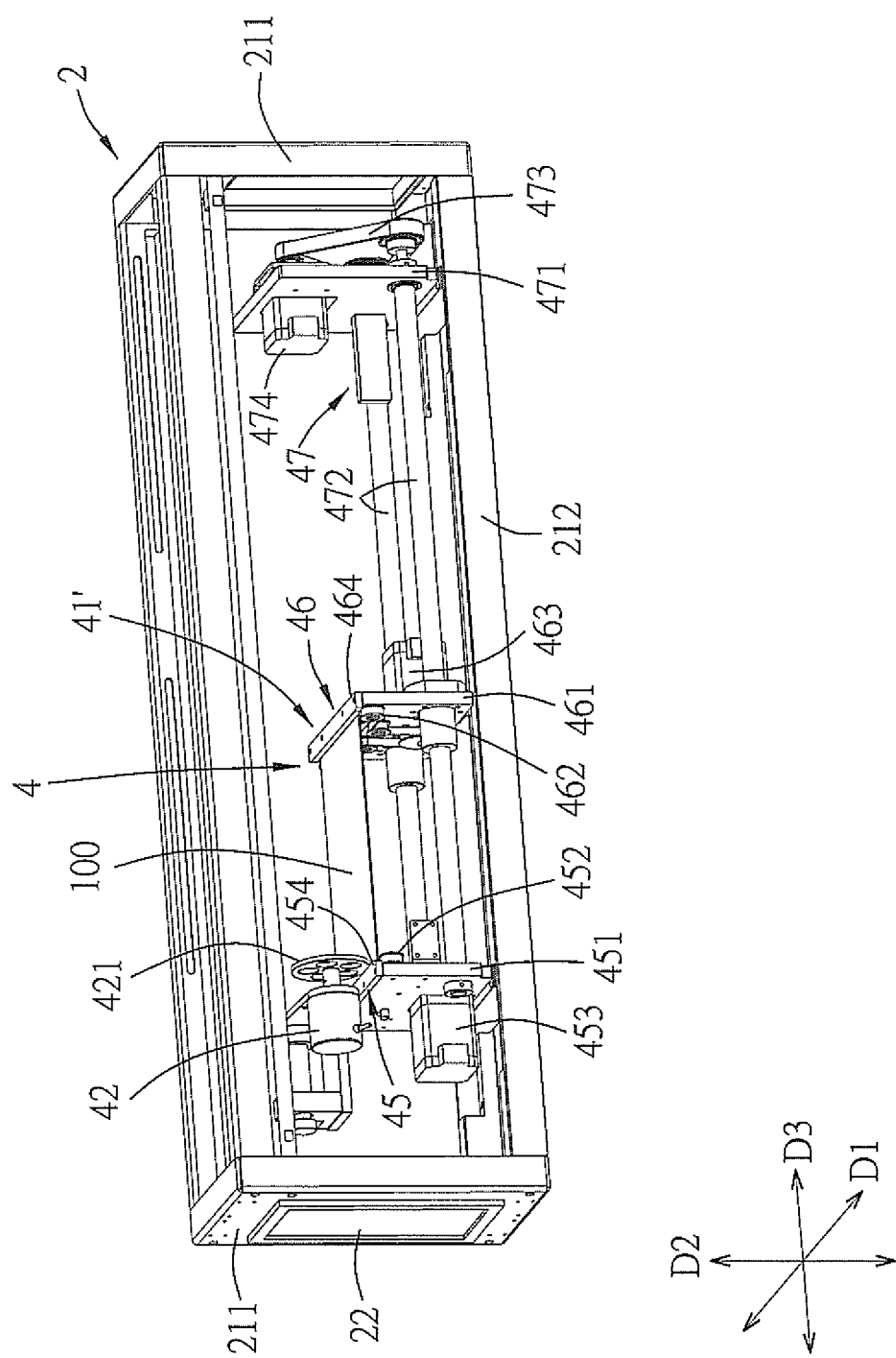
FIG. 10 is similar to FIG. 9 but from another angle.
Figure 11:
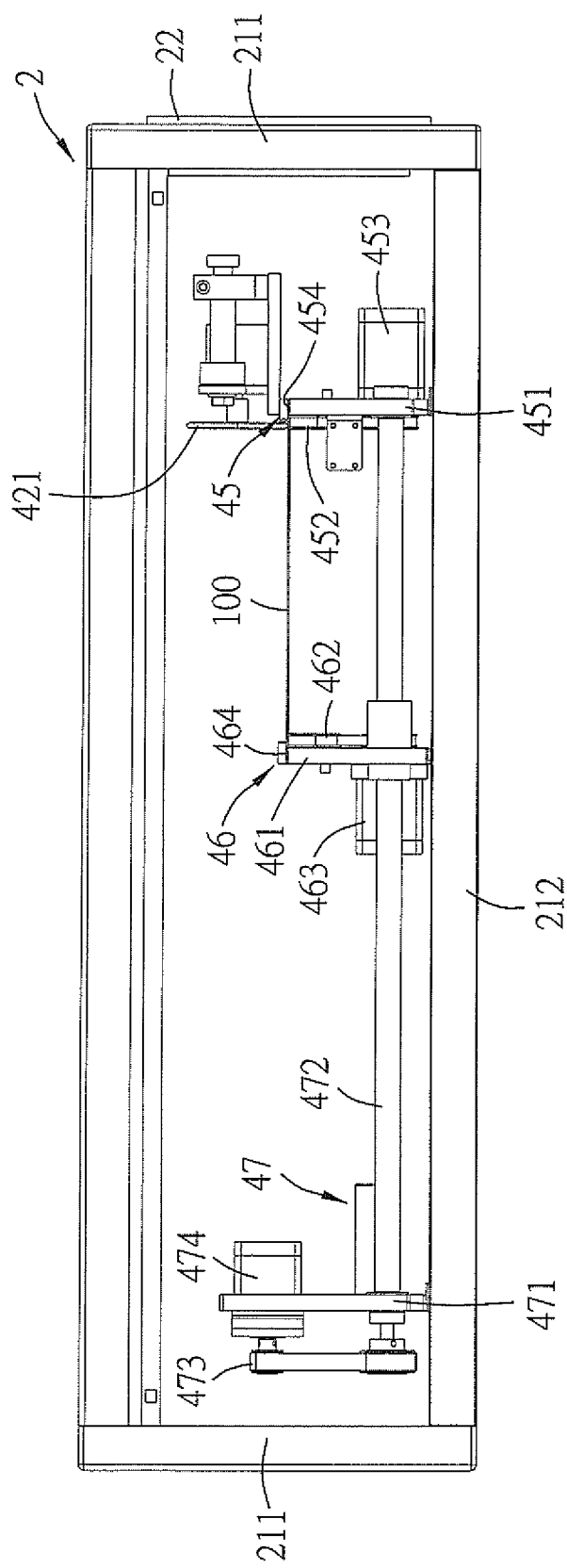
FIG. 11 is a front view of the conveyance unit and the frame of the variation of the first embodiment.

Referring to FIGS. 9 to 11, in a variation of the first embodiment, the conveyance unit 4 includes a conveyor belt module 41', the speed encoder 42, and a width adjusting module 47. The conveyor belt module 41' includes a secured assembly 45 and a movable assembly 46 being spaced apart in a third direction which is transverse to the first and second directions. In this embodiment, the third direction is the left-right direction (D3). The secured assembly 45 is proximal to one of the wall portions 211 of the frame 2. The object 100 can be placed between the secured assembly 45 and the movable assembly 46 for conveyance, and the width adjusting module 47 is operable to move the movable assembly 46 in the left-right direction (D3) relative to the secured assembly 45 for adjusting a distance therebetween so as to convey the object 100. In other words, the movable assembly 46 may be moved in the left-right direction (D3) to be proximal to or distal from the secured assembly 45, thus adjusting a distance between the secured assembly 45 and the movable assembly 46 to match the width of the object 100.

Each of the secured assembly 45 and the movable assembly 46 includes a track seat 451, 461, a transmission mechanism 452, 462, and a motor 453, 463. In this embodiment, the track seats 451, 461 are upright plates and are each formed with a track 454, 464 proximal to an upper edge thereof. The transmission mechanisms 452, 462 are respectively disposed on inner sides of the track seats 451, 461. The motors 453, 463 are respectively disposed on the track seats 451, 461 and respectively connected to the transmission mechanisms 452, 462 to respectively drive the transmission mechanisms 452, 462. In this embodiment, each of the transmission mechanisms 452, 462 is a belt and pulley system, wherein the respective one of the motors 452, 462 rotates the pulley to drive the belt to move. The belts of the transmission mechanisms 452, 462 are respectively disposed adjacently below the tracks 454, 464 to convey the object 100 received in the tracks 454, 464.

The width adjusting module 47 includes a fixed seat 471, two guide rods 472, a transmission mechanism 473, and a motor 474. The fixed seat 471 is proximal to the other one of the wall portions 211 of the frame 2, and the movable assembly 46 is disposed between the secured assembly 45 and the fixed seat 471. The guide rods 472 are screw rods and are threadedly engaged with the track seat 461 of the movable assembly 46 such that the rotation of the guide rods 472 drives the movable assembly 46 to move along the guide rods 472. The two ends of each of the guide rods 472 are disposed respectively at the track seat 451 of the secured assembly 45 and the fixed seat 471. The motor 474 is disposed at the fixed seat 471 and connected to the guide rods 472 through the transmission mechanism 473 such that the motor 474 can drive the rotation of the guide rods 472. In this embodiment, the transmission mechanism 473 of the width adjusting module 47 is also a belt and pulley system. The width adjusting module 47 drives an adjustment of the distance between the movable assembly 46 and the secured assembly 45.

In this variation, compared with the frame 2 shown in FIGS. 1 to 8, the handles 213 and the first coupling members 61 are omitted. Instead, the frame 2 further includes a touch display 22 disposed on the outer surface of one of the wall portions 211 and an openable door 214 similar to the side doors 317, 327 and disposed on the outer surface of the other one of the wall portions 211. The touch display 22 is communicably connected to the motor 474 of the width adjusting module 47 to allow the user to adjust the distance between the secured and movable assemblies 45, 46 through operation of the touch display 22.

Figure 12:
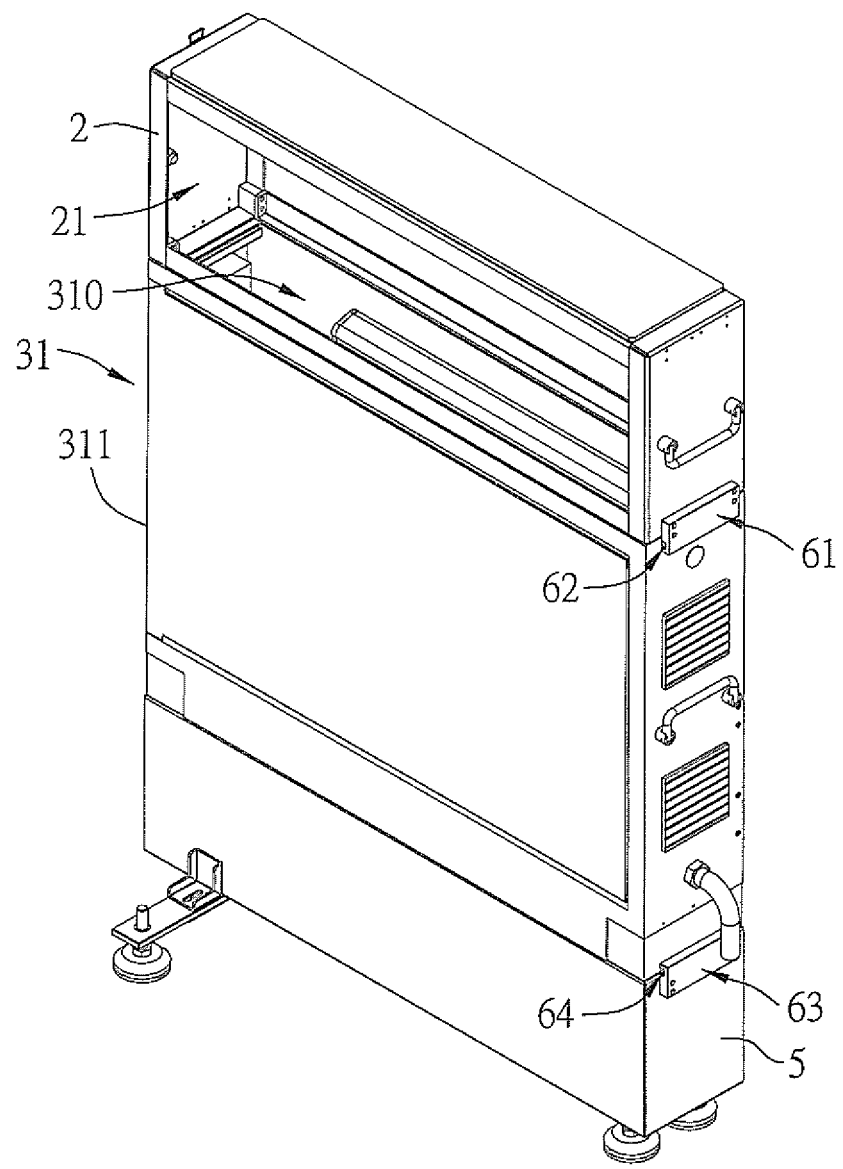
FIG. 12 is a perspective view of a second embodiment of the scanning apparatus according to the disclosure.
Figure 13:
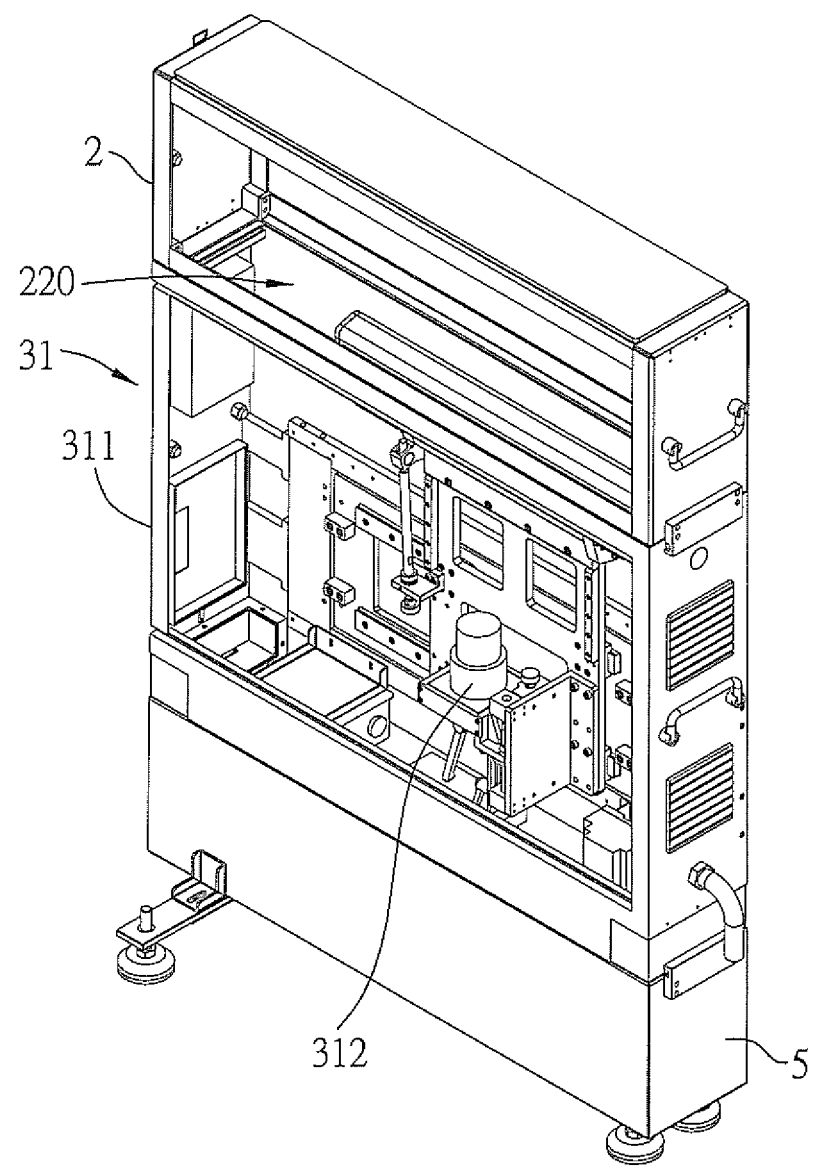
FIG. 13 is similar to FIG. 12 but with one of two base walls of the first scanning device of the second embodiment omitted.

Referring to FIGS. 12 and 13, the second embodiment of the scanning apparatus is similar to the first embodiment, but differs in that the scanning unit 3 of the second embodiment only includes the first scanning devices 31. In other words, the second scanning device 32 is omitted in the second embodiment. One of the second coupling members 62 which is mounted to the second scanning device 32 in the first embodiment, and one of the first coupling members 61 corresponding to said one of the second coupling members 62 are also omitted.

In the second embodiment, one of the frame openings 220 is directly connected to the scanning opening 310 of the first scanning device 31, and the first scanner 312 disposed in the receiving space 301 points upwards for scanning one surface of the object 100 (see FIG. 1) during movement of the object 100 through the passage 21 of the frame 2. To scan another surface of the object 100, the object 100 needs to be flipped relative to the scanning apparatus.

Figure 14:
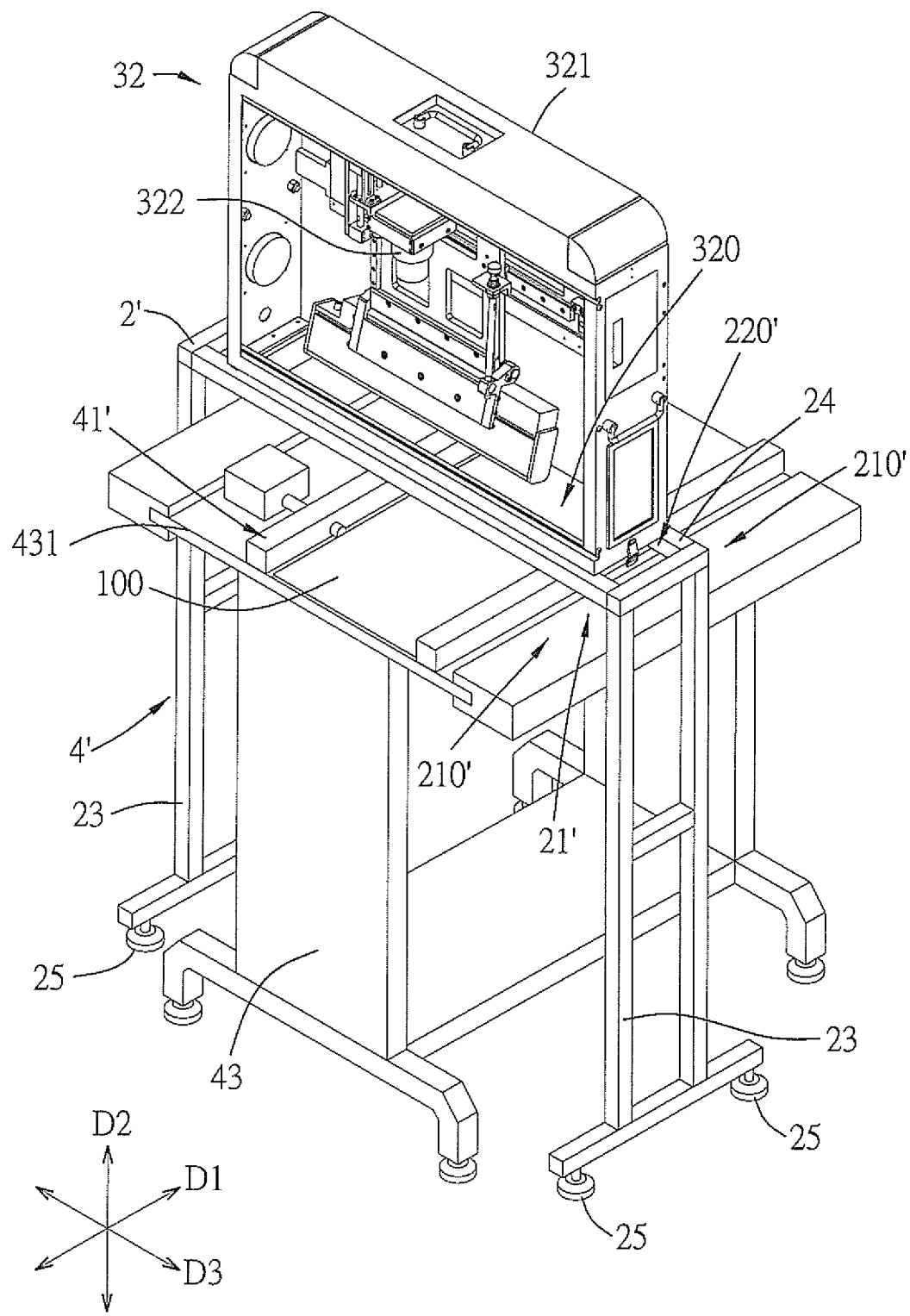
FIG. 14 is a perspective view of a third embodiment of the scanning apparatus according to the disclosure with one of two base walls of the second scanning device omitted.

Referring to FIG. 14, a third embodiment of the scanning apparatus is similar to the first embodiment, but differs in that the first scanning device 31 is omitted. In other words, the scanning unit 3 only includes the second scanning device 32. The base seat 5 is also omitted in the third embodiment. The frame 2' of the third embodiment includes two support legs 23 and a top portion 24 connected to upper portions of the support legs 23. The passage 21' having the passage openings 210' is defined by the support legs 23 and the top portion 24. In the third embodiment, one of the frame opening 220' is formed in the top portion 24 and is directly connected to the scanning opening 320 of the second scanning device 32. Lower portions of the support legs 23 may be respectively connected to wheels or table feet 25.

The frame 2' of the third embodiment supports the scanning unit 3 and allows the conveyance unit 4' to be disposed thereunder. In the third embodiment, the conveyance unit 4' includes a conveyor belt module 41' and a supportive frame 43. The supportive frame 43 has a platform 431 on which the conveyor belt module 41' is disposed.

When the scanning apparatus is being used, the conveyance unit 4' is disposed below the top portion 24 of the frame 2' and extends out of the passage openings 210' along the front-rear direction (D1). The object 100 is disposed on the conveyor belt module 41' and moves through the passage 21 below the top portion 24 of the frame 2 to be scanned by the second scanning device 32. The configuration of the frame 2' and the conveyance unit 4' in the third embodiment allows the scanning apparatus to scan the object 100 with a wider variety of dimension. As the conveyance unit 4' is not connected to the frame 2', the conveyance unit 4' may be swapped with conveyance units of different specifications or existing, conventional conveyance units.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A scanning apparatus for scanning an object, comprising:
   a frame defining:
      a passage that has two passage openings that are opposite to each other in a first direction; and
      two frame openings that are opposite to each other in a second direction transverse to the first direction, and that are in spatial communication with said passage; and
   a scanning unit including at least one scanning device that includes:
      a scanning casing having a scanning opening that is in direct connection with one of said frame openings of said frame; and
      a scanner disposed in said scanning casing, and operable to scan the object via said scanning opening and the one of said frame openings when the object is moving through said passage in the first direction,
      wherein the first direction and the second direction are perpendicular to each other, and
      wherein said scanner of said at least one scanning device is a line scan camera that has a scanning range covering a width of the object in a width direction which is perpendicular to the first and second directions, and that is operable to scan the width of the object continuously in the first direction and to combine multiple scan images of the width of the object to form an image of the entire object.

2. The scanning apparatus as claimed in claim 1, wherein said at least one scanning devices includes two scanning devices, said scanning openings of said scanning devices being respectively in direct connection with said frame openings of said frame so that said scanners of said scanning devices are operable to scan the object from two opposite directions during the movement of the object through said passage.

3. The scanning apparatus as claimed in claim 1, wherein said scanning casing of said at least one scanning device has:
   two base walls opposite to each other in the first direction;
   a side wall interconnecting said base walls, and cooperating with said base walls to define a receiving space that retains said scanner therein;
   a plurality of side openings formed in said side wall; and
   a side door openably covering said side openings.

4. The scanning apparatus as claimed in claim 1, further comprising a conveyance unit extending through said passage of said frame, and adapted for loading the object and assisting the object through said passage.

5. The scanning apparatus as claimed in claim 4, wherein said conveyance unit includes a speed encoder, said speed encoder being communicably connected to said scanner of said at least one scanning device and having a sync wheel, said sync wheel being adapted for contact with the object to obtain a speed at which the object is moving through said passage.

6. The scanning apparatus as claimed in claim 4, wherein said conveyance unit includes:
   a conveyor belt module that includes a secured assembly and a movable assembly being spaced apart in a third direction which is transverse to the first and second directions; and
   a width adjusting module that is operable to move said movable assembly in the third direction relative to said secured assembly for adjusting a distance therebetween so as to convey the object therebetween.

7. The scanning device as claimed in claim 6, wherein said conveyance unit further includes a speed encoder, said speed encoder being communicably connected to said scanner of said at least one scanning device and having a sync wheel, said sync wheel being adapted for contact with the object to obtain a speed at which the object is moving through said passage.

8. The scanning apparatus as claimed in claim 1, wherein:
   said scanning apparatus further comprises two first coupling members mounted to said frame and being respectively proximal to said frame openings, and at least one second coupling member mounted to said scanning casing of said at least one scanning device, said at least one second coupling member being removably coupled with one of said first coupling members which is proximal to the one of said frame openings so as to secured said frame with said scanning unit;
   each of said first coupling members includes a hook portion;
   said at least one second coupling member includes a ring portion; and
   said ring portion of said at least one second coupling member is coupled with said hook portion of the one of said coupling members which is proximal to the one of said frame openings.

9. The scanning apparatus as claimed in claim 1, wherein:
   said scanning apparatus further comprises two first coupling members mounted to said frame and being respectively proximal to said frame openings, and at least one second coupling member mounted to said scanning casing of said at least one scanning device, said at least one second coupling member being removably coupled with one of said first coupling members which is proximal to the one of said frame openings so as to secured said frame with said scanning unit;
   each of said first coupling members includes a clamp portion;
   said at least one second coupling member includes a block portion; and
   said block portion of said at least one second coupling member is coupled with said clamp portion of the one of said first coupling members which is proximal to the one of said frame openings.

10. The scanning apparatus as claimed in claim 1, wherein:
    said frame includes two support legs and a top portion connected to upper portions of said support legs;
    said passage is defined by said support legs and said top portion;
    one of said frame openings is formed in said top portion; and
    lower portions of said support legs are adapted to be respectively connected to one of wheels or table feet.

11. A scanning apparatus for scanning an object, comprising:
    a frame defining
       a passage that has two passage openings that are opposite to each other in a first direction, and
       two frame openings that are opposite to each other in a second direction transverse to the first direction, and that are in spatial communication with said passage;
    a scanning unit including at least one scanning device that includes
       a scanning casing having a scanning opening that is in direct connection with one of said frame openings of said frame, and
       a scanner disposed in said scanning casing, and operable to scan the object via said scanning opening and the one of said frame openings when the object is moving through said passage in the first direction; and
    two first coupling members mounted to said frame and being respectively proximal to said frame openings, and at least one second coupling member mounted to said scanning casing of said at least one scanning device, said at least one second coupling member being removably coupled with one of said first coupling members which is proximal to the one of said frame openings so as to secured said frame with said scanning unit.

12. The scanning apparatus as claimed in claim 11, wherein the first direction and the second direction are perpendicular to each other.

13. The scanning apparatus as claimed in claim 11, wherein said scanning casing of said at least one scanning device has:
    two base walls opposite to each other in the first direction;
    a side wall interconnecting said base walls, and cooperating with said base walls to define a receiving space that retains said scanner therein;
    a plurality of side openings formed in said side wall; and
    a side door openably covering said side openings.

14. The scanning apparatus as claimed in claim 11, further comprising a conveyance unit extending through said passage of said frame, and adapted for loading the object and assisting the object through said passage.

15. The scanning apparatus as claimed in claim 14, wherein said conveyance unit includes a speed encoder, said speed encoder being communicably connected to said scanner of said at least one scanning device and having a sync wheel, said sync wheel being adapted for contact with the object to obtain a speed at which the object is moving through said passage.

16. The scanning apparatus as claimed in claim 14, wherein said conveyance unit includes:
   a conveyor belt module that includes a secured assembly and a movable assembly being spaced apart in a third direction which is transverse to the first and second directions; and
   a width adjusting module that is operable to move said movable assembly in the third direction relative to said secured assembly for adjusting a distance therebetween so as to convey the object therebetween.

17. The scanning device as claimed in claim 16, wherein said conveyance unit further includes a speed encoder, said speed encoder being communicably connected to said scanner of said at least one scanning device and having a sync wheel, said sync wheel being adapted for contact with the object to obtain a speed at which the object is moving through said passage.

18. The scanning apparatus as claimed in claim 11, wherein said at least one scanning devices includes two scanning devices, said scanning openings of said scanning devices being respectively in direct connection with said frame openings of said frame so that said scanners of said scanning devices are operable to scan the object from two opposite directions during the movement of the object through said passage.

19. The scanning device as claimed in claim 11, wherein:
   each of said first coupling members includes a hook portion;
   said at least one second coupling member includes a ring portion; and
   said ring portion of said at least one second coupling member is coupled with said hook portion of the one of said coupling members which is proximal to the one of said frame openings.

20. The scanning device as claimed in claim 11, wherein:
   each of said first coupling members includes a clamp portion;
   said at least one second coupling member includes a block portion; and
   said block portion of said at least one second coupling member is coupled with said clamp portion of the one of said first coupling members which is proximal to the one of said frame openings.

\* \* \* \* \*